(12) United States Patent
DelCharco

(10) Patent No.: US 10,457,125 B2
(45) Date of Patent: Oct. 29, 2019

(54) METHODS AND APPARATUS FOR TEMPORARY CARGO BED COVER

(71) Applicant: Michael James DelCharco, Jacksonville, FL (US)

(72) Inventor: Michael James DelCharco, Jacksonville, FL (US)

(73) Assignee: Michael DelCharco, Jacksonville, FL (US)

( * ) Notice: Subject to any disclaimer, the term of this patent is extended or adjusted under 35 U.S.C. 154(b) by 830 days.

(21) Appl. No.: 15/054,908

(22) Filed: Feb. 26, 2016

(65) Prior Publication Data

US 2016/0280125 A1    Sep. 29, 2016

Related U.S. Application Data

(60) Provisional application No. 62/177,692, filed on Mar. 23, 2015.

(51) Int. Cl.
*B60P 7/04* (2006.01)
*B29C 65/48* (2006.01)
*B60J 7/10* (2006.01)

(52) U.S. Cl.
CPC ..................................... *B60J 7/10* (2013.01)

(58) Field of Classification Search
CPC . B60P 7/04; B60P 7/0876; B60P 7/102; B60J 7/102
See application file for complete search history.

(56) References Cited

U.S. PATENT DOCUMENTS

| 4,668,007 | A  | * | 5/1987  | Sloan       | B60P 7/04    |
|           |    |   |         |             | 296/100.15   |
| 5,431,284 | A  | * | 7/1995  | Wilson      | B29C 47/065  |
|           |    |   |         |             | 206/386      |
| 5,716,176 | A  | * | 2/1998  | Anderson    | B60P 7/0876  |
|           |    |   |         |             | 296/100.16   |
| 5,747,131 | A  | * | 5/1998  | Kreckel     | B65B 13/02   |
|           |    |   |         |             | 428/40.1     |
| 6,010,176 | A  | * | 1/2000  | Jones       | B60J 7/102   |
|           |    |   |         |             | 105/377.02   |
| 6,634,850 | B2 | * | 10/2003 | Christensen | B60J 7/102   |
|           |    |   |         |             | 135/87       |
| 6,811,202 | B2 | * | 11/2004 | Hornady     | B60P 7/04    |
|           |    |   |         |             | 212/328      |
| 6,971,827 | B1 | * | 12/2005 | Embach      | B60P 7/0876  |
|           |    |   |         |             | 296/97.23    |
| 7,037,056 | B2 | * | 5/2006  | Lynch       | B60P 7/0876  |
|           |    |   |         |             | 410/97       |
| 8,408,852 | B1 | * | 4/2013  | Bullock     | B60P 7/15    |
|           |    |   |         |             | 410/118      |
| 9,388,329 | B2 | * | 7/2016  | Ulsh        | B32B 5/04    |
| 9,682,790 | B2 | * | 6/2017  | Nelson      | B65B 61/02   |

(Continued)

*Primary Examiner* — Jacob T Minskey
*Assistant Examiner* — Marta S Dulko
(74) *Attorney, Agent, or Firm* — Joseph P. Kincart; Rogers Towers, P.A.

(57) ABSTRACT

The present disclosure provides methods and apparatus for sealing a cargo bed, such as a cargo bed included on a pickup truck or a utility trailer. In particular the present invention provides for a removable and disposable sealing membrane or overlay adhesively attached to a cargo bed for containing contents within the cargo bed and also repelling elements of an ambient environment from entering the cargo bed of the truck or trailer.

20 Claims, 5 Drawing Sheets

(56) References Cited

U.S. PATENT DOCUMENTS

| | | | |
|---|---|---|---|
| 2005/0158137 A1* | 7/2005 | Lynch | B60P 7/0876 410/97 |
| 2009/0289142 A1* | 11/2009 | Payne | B60P 7/04 242/564 |
| 2010/0322736 A1* | 12/2010 | Bullock | B32B 5/08 410/97 |
| 2012/0001010 A1* | 1/2012 | Payne | B26D 1/00 242/390.2 |
| 2014/0099172 A1* | 4/2014 | Geske | B60P 7/0876 410/118 |

* cited by examiner

METHODS AND APPARATUS FOR TEMPORARY CARGO BED COVER

CROSS REFERENCE TO RELATED APPLICATIONS

This application claims the benefit of the U.S. Provisional Application Ser. No. 62/177,692 filed on Mar. 23, 2015 entitled PROCESS & APPARATUS FOR PICKUP TRUCK BED COVERS the contents of which are hereby included by reference.

FIELD OF THE DISCLOSURE

The present disclosure relates to methods and apparatus for sealing the bed of a truck or trailer, and more specifically the present invention provides for a sealing membrane or overlay for containing contents within the bed of the truck or trailer and also repelling elements of an ambient environment from entering the bed of the truck or trailer.

BACKGROUND OF THE DISCLOSURE

Pick-up trucks and trailers have long been used to transport a variety of articles and substances. The majority of pick-up trucks and trailers do not include an integral mechanism to cover bed contents. As a result plastic tarps are often draped over the top of the bed and any contents within the bed and secured with ties and bungee cords. However, the tarps do not provide a seal to contain contents included in the bed of the truck or trailer and are also do not seal out moisture and/or dust.

Custom fitted hard shell tonneau covers have been developed that provide rigid enclosures, but these are relatively expensive and typically become a semi-permanent part of the vehicle once installed. In addition, rigid tonneau covers limit the contents of the bed from extending above a side of the truck or trailer. In addition, permanent tonneau covers often impede loading and unloading of a cargo bed. Soft tonneau covers have similar drawbacks and in addition, although a semi-permanent part of the vehicle do not wear well and do not always provide a sufficient seal against the weather elements.

SUMMARY OF THE INNOVATION

Accordingly, the present invention provides for a temporary and disposable cover of a cargo bed, such as the cargo bed of a pickup truck or a trailer. According to the present invention, a flexible membrane is coated with an adhesive that allows for both the membrane to be fixedly attached to a vehicle with a cargo bed while deployed as a cover of a cargo bed and easily removed when the deployment is concluded. The adhesive layer may be pressure sensitive to facilitate ease of installation and adequate binding power once positioned in a desired location.

In some implementations, the membrane is impermeable to water and air and provides a moisture proof seal against weather or other elements on the exterior of a cargo bed enclosure. In other embodiments, the membrane may allow for air passage and be breathable, such the plants of other air sensitive cargo may be stored in the cargo bed with no adverse affect.

The adhesive is preferably water resistant when deployed and may be soluble with an alcohol or other solvent that is not harmful to the finish of a cargo bed vehicle, during cleanup of any residual adhesive on the vehicle following deployment of the temporary cargo bed cover.

In another aspect, the membrane may be opaque to protect the identity of the contents within the cargo bed. An opaque cover protects items such as tools, equipment, groceries, or other items placed in the cargo bed from the sight of the public and potential thieves.

In still another aspect at least some portions of the membrane may be transparent to allow for inspection of the contents of a cargo bed, such as highway inspection stops or for the ease of location of an article within a covered cargo bed. It is within the scope of the invention to include both opaque and transparent portions of a same sheet of membrane and to deploy disparate sheets of membrane wherein some membrane sheets are opaque and other sheets are transparent.

In still another aspect, membrane sheets may include printing, such as advertising, a logo, identification of contents within the sealed cargo bed (such as color coding and/or words and/or symbol to designate what is contained beneath). For example a rented or leased vehicle may be supplied with sheets of membrane according to the present invention that include a brand of the rental of leasing company.

In still another aspect, membrane sheets may be disposable and in some embodiments, comprise a recyclable and/or biodegradable material.

In some deployments of the present invention, a portion of a deployed membrane may be removed, such as via cutting with a utility knife to gain access to an article stored in the cargo bed. The cargo bed may be subsequently resealed with a replacement section of membrane without disturbing the unaffected area of membrane sealing the remainder of the cargo bed.

In still another aspect, the membrane may be deployed to cover an article within the bed i.e. luggage or container in addition to or as an alternative to covering the cargo bed.

In general the membrane may include rolls or sections of water impermeable sheeting generally 12-48 inches wide, but up to 96 inches wide. Preferred embodiments include— polyethylene sheeting, although other embodiments may include, by way of nonlimiting example: Polyvinyl chloride, polypropylene, high density polyethylene, low density polyethylene (LDPE)polyurethane, Polyvinylidene chloride (PVDC) or other homopolymer of vinylidene chloride, or equivalent.

In still another aspect, in some embodiments, an adhesive used to bind the membrane to a cargo may be supplemented with devices to provide additional mechanical binding strength, such as a wedges sized to fit between the cargo bed and a cab of a vehicle. IN some embodiments, the wedge may be fashioned from a formable material such as a high density foam.

In still another aspect, a cargo bed cover may be a temporary means to improve gas mileage. Studies have shown that at least some vehicles will increase gas mileage due to a change in aerodynamics of using a cargo bed cover, and in particular to using a cargo bed cover over an otherwise empty cargo bed. The present invention allows for a convenient way to improve gas mileage experienced during operation of the vehicle without the need for a large investment in a permanent cargo bed cover.

The present invention provides methods and apparatus for sealing a cargo bed of a vehicle via one or more of the steps of: positioning a first sheet of membrane with an adhesive layer on a first side of the membrane proximate to a first receiving surface proximate to the cargo bed; affixing a first portion of the membrane to the receiving surface of the cargo bed by applying pressure to a second side of the first portion of membrane; extending a second portion of the first sheet of membrane across the cargo bed to a second receiving surface proximate to the cargo bed thereby covering at least a portion of the cargo bed with the membrane; affixing a third portion of the membrane to the second receiving surface by applying pressure to a second side of the second portion of membrane; extracting the first portion or membrane and the second portion of membrane from a roll of membrane; extending the second portion of membrane in an upward direction in relation to the cargo bed, after affixing the first portion of membrane to the first receiving surface and prior to extending the second portion across the cargo bed; extending a fourth portion of the membrane over a tailgate proximate to the cargo bed; folding the fourth portion downward over the tailgate; adhering the fourth portion to the tailgate; and providing a cut away in the membrane.

In one aspect, the cut away accommodates a feature of the vehicle, such as a taillight or a tailgate handle. The membrane may include a water impermeable sheet and be between about 0.5 and 15 mils thick. In another aspect, the membrane sheet additionally may include a pattern of color such as, one or both of: a written language or an image. The pattern of color may include an indication of the contents of the cargo bed.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION OF THE INVENTION

The present disclosure provides generally for a temporary cover of a cargo bed in the form of a membrane with an adhesive surface. According to the present disclosure, the membrane may be applied to a vehicle with the cargo bed and seal in the contents of the cargo bed and simultaneously excluding artifacts from an exterior environment from entering the cargo bed.

In the following sections, detailed descriptions of examples and methods of the disclosure will be given. The description of both preferred and alternative examples though through are exemplary only, and it is understood that to those skilled in the art that variations, modifications, and alterations may be apparent. It is therefore to be understood that the examples do not limit the broadness of the aspects of the underlying disclosure as defined by the claims.

Glossary

Cargo Bed: as used herein refers to a bed of a pickup truck or trailer with at least partial sides and an open top.

Membrane: as used herein refers to a sheet of water proof or water resistant material. The sheet may include one or both of a contiguous water impermeable surface and a mesh including a breathable surface.

Adhesive: as used herein refers to a substance that causes to two disparate surfaces to stick together. In the context of the present disclosure and adhesive is used to stick a Membrane to a vehicle including a cargo bed.

Figure 1:
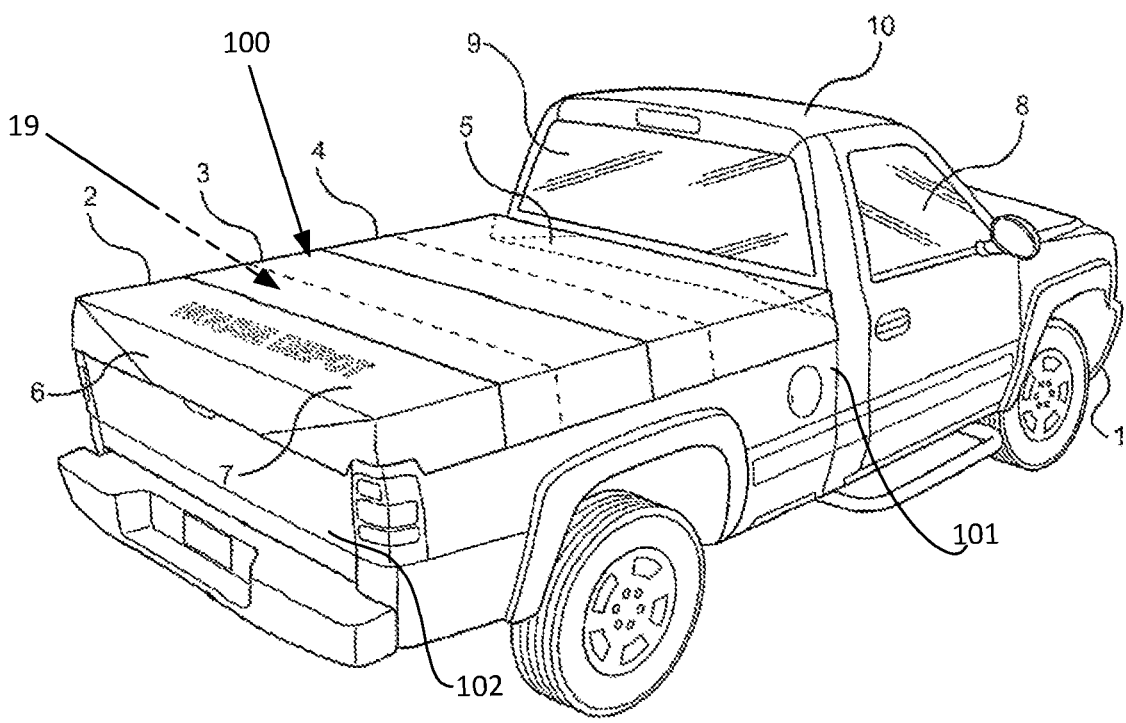
FIG. 1 illustrates a perspective view of a cargo bed.

Referring now to FIG. 1, a vehicle 1 including a cargo bed 19 (shown in FIG. 2) with a cargo bed cover 100 covering the cargo bed 19. The cargo bed cover 100 includes multiple sheets of membrane 2-4 adhesively affixed to the vehicle 1 that includes the cargo bed 19. It should be noted that although the vehicle 1 is illustrated a pickup truck, other vehicles, such as a trailer or a flatbed truck are also within the scope of the present disclosure. The sheets of membrane 2-4 are each adhesively affixed to the vehicle 1 via a layer of adhesive material between the vehicle 1 and the sheet of membrane.

As illustrated, three sheets of membrane 2-4 are used to cover the cargo bed 19. It is within the scope of the present invention to use a single sheet of membrane with adhesive to cover the cargo bed 19; or more or less than three sheets of membrane 2-4; to cover the cargo bed 19. In general, the number of sheets will depend upon factors such as the length and width of each sheet, a size of the cargo bed and a desired strength of a cargo bed cover 100 which may be based upon an amount of overall of the sheets of membrane 2-4.

It is also within the scope of the invention to utilize one or both of: a cab side fold 5 and a tailgate side fold 6 to further affix membrane sheets 4 and 2 respectively to the vehicle 1. The use of a cab side fold 5 and a tailgate side fold 6 provides additional adherence strength for attaching the membranes 2&4 to the vehicle 1 and also prevent excess membrane from flapping in a wind resulting from transport of the vehicle 1 and associated cargo bed 19.

In general as illustrated in FIG. 1, the sheets of membrane 2-4 extend transversely across the cargo bed 19 from a drivers side 9 of the vehicle 1 to a passenger side 8 of the vehicle 1. Other implementations may include the sheets of membrane positioned from a front side of a cargo bed 101 to a rear side of a cargo bed 102. Similarly a direction of installation may vary according to a particular application. For example, installation may originate on a passenger side and continue to a driver's side of a vehicle, or originate on a rear of a vehicle and continue to forward on a vehicle. Other arrangements of sheets of membranes 2-4 are also within the scope of the present disclosure.

The sheets of membrane 2-4 may comprise a water proof or water resistant material. The sheet may include one or both of: a contiguous water impermeable surface and a mesh including a breathable surface. In some embodiments, specific portions of the sheet of membrane 2-4 are formed into predictable patterns of water impermeable surface and breathable surface such that a user may position water impermeable portions of a surface of a membrane and breathable portions of a membrane. For example a user may wish to position the various portions according to a location of items stored beneath the sheets of membrane. Items such as plants may benefit from a breathable surface and items that may be damaged by water may need to be positioned under water impermeable portions. In still other embodiments, one or more of a first sheet of membrane 2, a second sheet of membrane 3, and a third sheet of membrane 4 may be impervious to water and an adjacent sheet 2-4 may be a breathable material.

The sheets of membrane 2-4 may be one or both of: stored and shipped in rolls or sections of water impermeable or breathable sheeting. Variations may include rolls from about twelve inches wide to a roll that is wide enough to cover a typical cargo bed in a single pass forming a single sheet of membrane to completely cover the cargo bed 19. For example, roll that is wide enough to cover a typical cargo bed in a single pass be up to about ninety six inches wide.

In some preferred embodiments the sheets of membrane include polyethylene sheeting. Additional embodiments may include, by way of nonlimiting example, one or more of: polyvinyl chloride, polypropylene, high density polyethylene, low density polyethylene (LDPE), polyurethane, polyester, Polyvinylidene chloride (PVDC) or other homopolymer of vinylidene chloride, or equivalent. The sheets of membrane may include a thickness of between about 0.5 mils to 15 mils thick. In some embodiments, the membrane may also include a UV coating to further protect the contents of a cargo bed.

In some embodiments, a spray adhesive or a roll on adhesive, may be used to coat the sheets of membrane 2-4. Suitable adhesives may include multiple almost any pressure sensitive adhesive or multi-polymer system that allows for a removable bond. Typically, a pressure sensitive adhesive layer is a permanently tack substance that will adhere with light pressure. Preferably, an adhesive layer will not require a chemical reaction to provide adhesion force. Pressure that is applied to create a bond between the membrane and a receiving surface of a vehicle may be variable according to a particular use, but will generally be between about 10 and 30 pounds per square inch.

Some implementations include a binder layer between the membrane and the adhesive layer. The binder is suitable to facilitate removal of the adhesive layer from the vehicle when the membrane is removed. One example of an adhesive includes Abatix™ spray multi-polymer spray adhesive.

In another aspect, the membrane may include multiple colors and the colors may be arranged in pattern providing meaning. For example the colors may include a human or machine recognizable image or written language. One or more colors may also be indicative of contents of a cargo bed. Colors may be integral into the membrane sheet or printed onto the membrane sheet. Printing on the sheets of membrane may be accomplished via known methods, such s, but not limited to, ink jet printing, roller printing and stamping. Printing may include branding or a message a user wishes to convey. In some implementations, printing may provide a designation of contents in a cargo bed. The designation of contents in a cargo bed may include one or both of: descriptive words and a color coding. Descriptive words may designate an identification of items stored in the cargo bed or an owner or destination for items in the cargo bed. Color coding may similarly designate an owner, destination or such a coding for a class of goods.

A receiving surface of a vehicle should generally be clean and dry. In some embodiments a surface may be cleaned with a solvent such as an alcohol, benzene, ester or a ketone.

Figure 2:
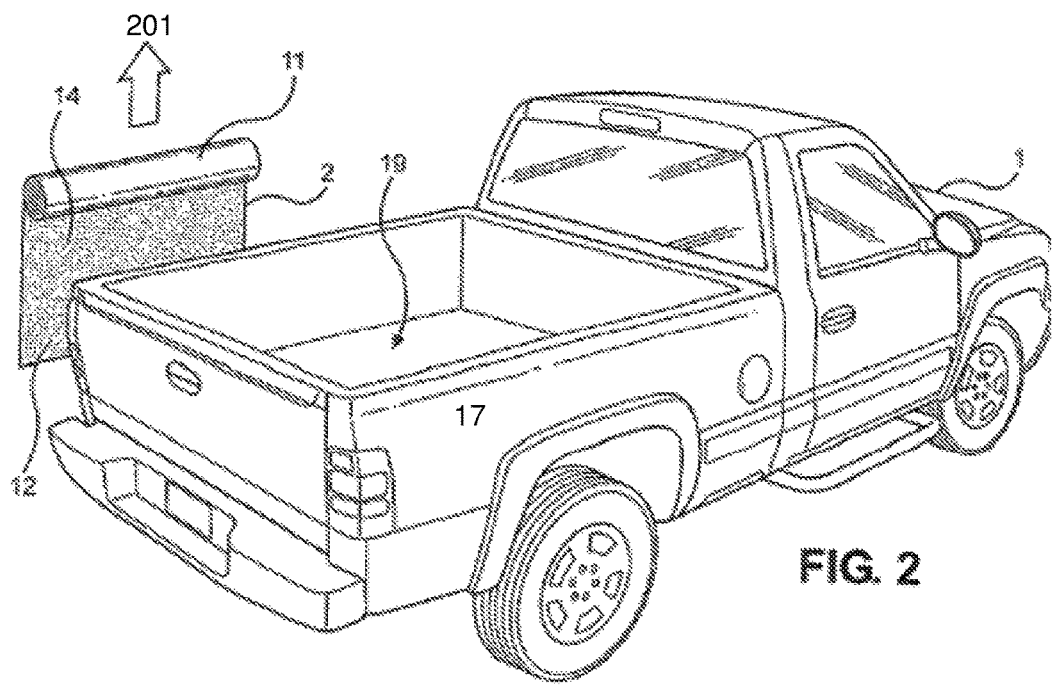
FIG. 2 illustrates a perspective view of an exemplary cargo bed with a cargo bed membrane pending attachment.

Referring now to FIG. 2, a perspective view illustrates a vehicle 1 with an empty cargo bed 19. As illustrated, a first sheet of membrane 2 is being extracted from a roll of membrane 11, a side of the first sheet of membrane 2 with an adhesive layer 14 is positioned against the driver's side extension of the vehicle 12 adjacent and generally perpendicular to the cargo bed 19, forming a removable adhesive bond, as the sheet of membrane 2 is extracted from the roll of membrane 11, it may be extended in an upward direction 201 in relation to the cargo bed 19 and then extended across the cargo bed covering at least a portion of the cargo bed.

Figure 3:
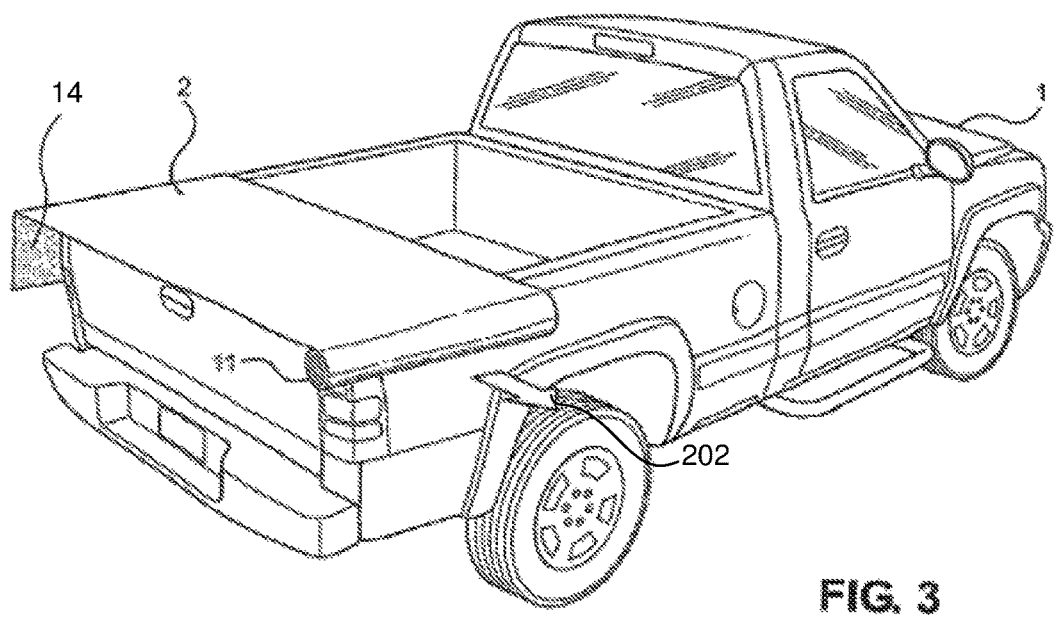
FIG. 3 illustrates a perspective view of an exemplary cargo bed with a cargo bed membrane partially attached.

Referring now to FIG. 3, as the first sheet of membrane 2 is continued to be extracted from the roll of membrane 11, and then extended across the cargo bed 19 (and over any contents within the cargo bed 19) in a direction 202 towards the passenger side extension 17 of the vehicle 1.

Figure 4:
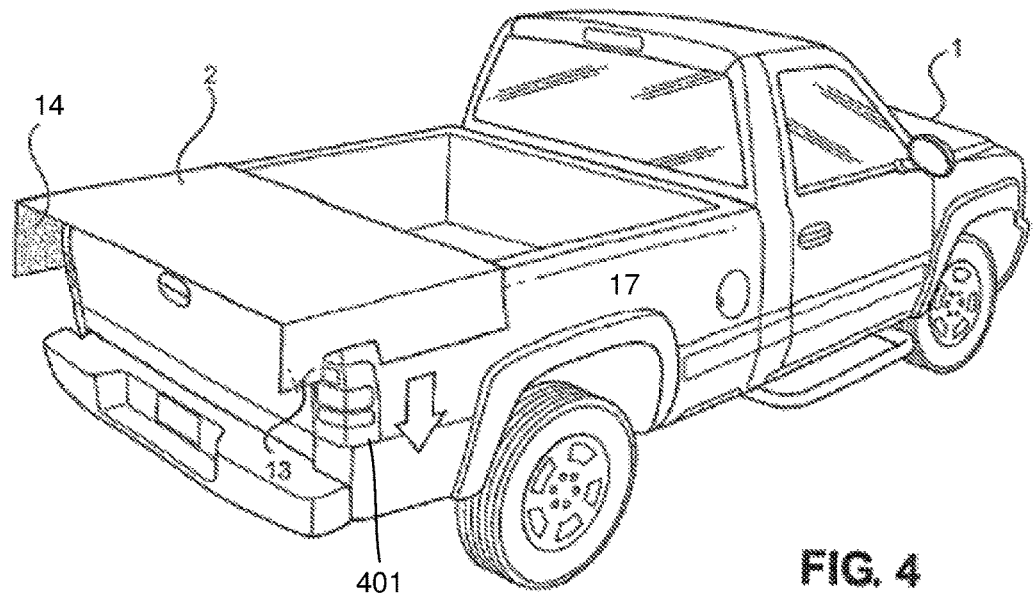
FIG. 4 illustrates a perspective view of an exemplary cargo bed with a cargo bed membrane attached and a fold being formed.

Referring now to FIG. 4, one or more cut aways 13 made be made in the first sheet 2 or any subsequent sheet to accommodate features of the vehicle 1, such as one or more of: a taillight 401 positioned on an extension of the vehicle 1, (as illustrated the passenger side extension 17); a handle in a tailgate; a tie down fixture; and a tie down access hole. The first sheet of membrane 2 is folded downward to adhere against the passenger side extension 17 in a area generally opposite to an area on the driver's side extension to which the sheet of membrane is adhered.

Figure 5:
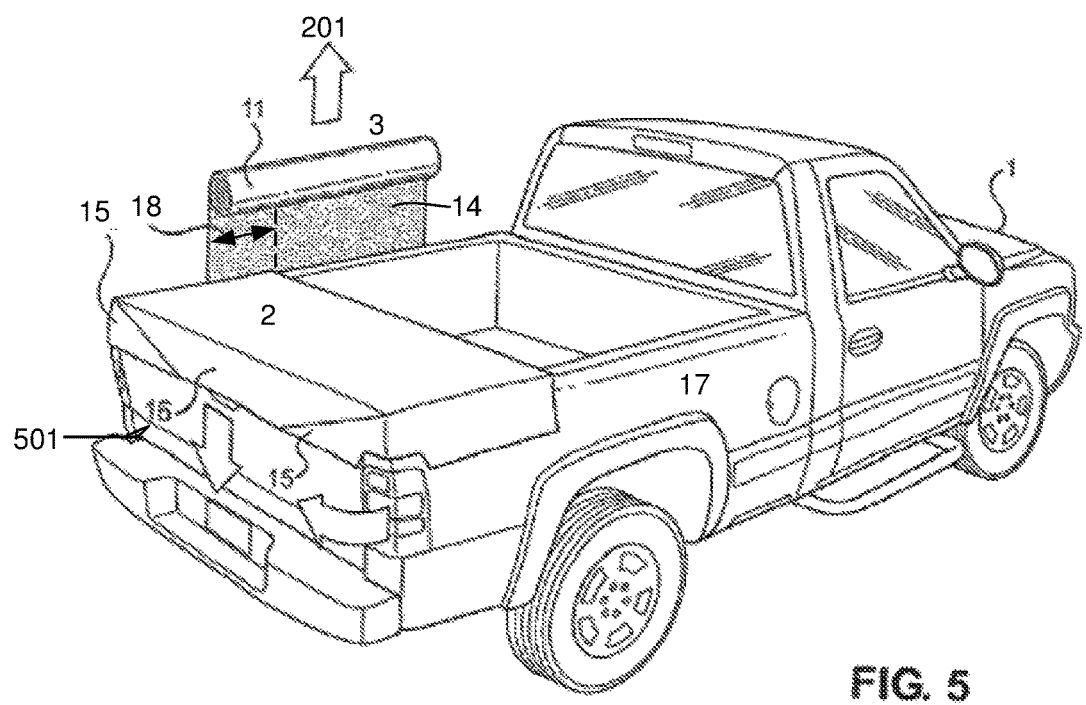
FIG. 5 illustrates a perspective view of an exemplary cargo bed with a first cargo bed membrane attached and a second membrane pending attachment.

Referring now to FIG. 5, the first sheet of membrane 2 may be formed downward to generate a tailgate fold 16 and one or more side folds 15 may also be formed. The folds 15-16 may be pressed against the tailgate 501 to generate a removable adhesive bond of the first sheet of membrane 2 to the tailgate 501. FIG. 5 additionally illustrates a second sheet of membrane 3 being extracted from the roll of membrane 11 in a generally upward direction 201. The adhesive side of the membrane 14 is again pressed against the vehicle 1 and an overlap portion 18 is positioned to press against the first sheet of membrane 2.

Figure 6:
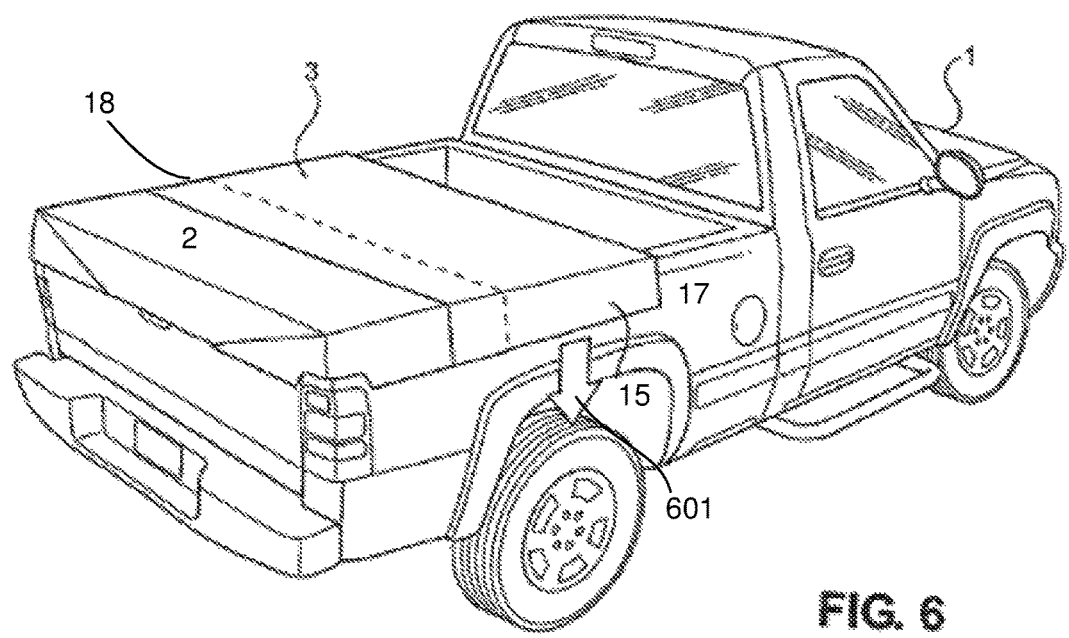
FIG. 6 illustrates a perspective view of an exemplary cargo bed with a first cargo bed membrane and a second cargo membrane attached.

Referring now to FIG. 6, the second sheet of membrane 3 is also extended across the cargo bed 19 and any contents within the cargo bed 19 to an opposite side of the cargo bed, which as illustrated is the passenger side extension 17 of the vehicle 1. In a similar fashion to the first sheet of membrane 2, the second sheet of membrane 3 is pulled in a downward direction 601 and removably adhered to the passenger side extension 17 via a passenger side fold 15. The overlap portion 18 is removably adhered to the first sheet of membrane 2.

Figure 7:
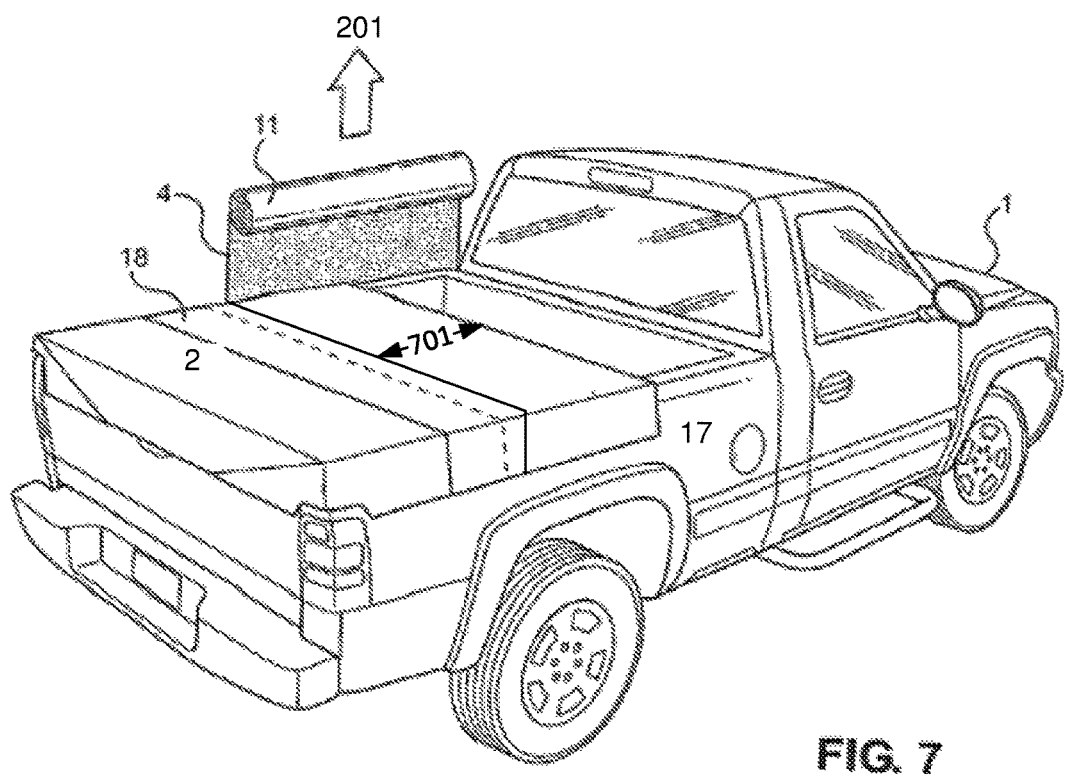
FIG. 7 illustrates a perspective view of an exemplary cargo bed with a first cargo bed membrane and a second cargo membrane attached and a third membrane pending attachment.

Referring now to FIG. 7, the process may be repeated to extract a third sheet of membrane 4 (and any subsequent sheets of membrane) from the roll of membrane 11. An overlap 701 will be formed with the previous sheet of membrane (as illustrated the second sheet of membrane 3) and the third (and subsequent sheets) of membrane will be adhered to the vehicle and previous sheets of membrane 2-4 until a desired portion of the cargo bed 19 is covered. In some preferred embodiments, enough sheets of membrane 2-4 will be applied to cover the entire cargo bed 19 and any contents within the cargo bed 19. A final sheet of membrane (as illustrated the third sheet of membrane 4) may also form a fold, such as the cab side fold 5 illustrated in FIG. 1.

Once adhered to the vehicle 1 in a manner completely covering the cargo bed 19, the sheets of membrane 2-4 may be adhered in a manner that seals the bed and the vehicle 1 in a water impermeable manner. In addition the sheets of membrane 2-4 adhered to the vehicle 1 will contain contents of the cargo bed, including mall items, such as gravel, wood chips and the like that may cause damage to vehicles following the vehicle 1 with the sealed cargo bed.

In a process generally the reverse of the covering of the cargo bed 19, the sheets of membrane 2-4 may be removed from the vehicle 1 and discarded or recycled.

Figure 8:
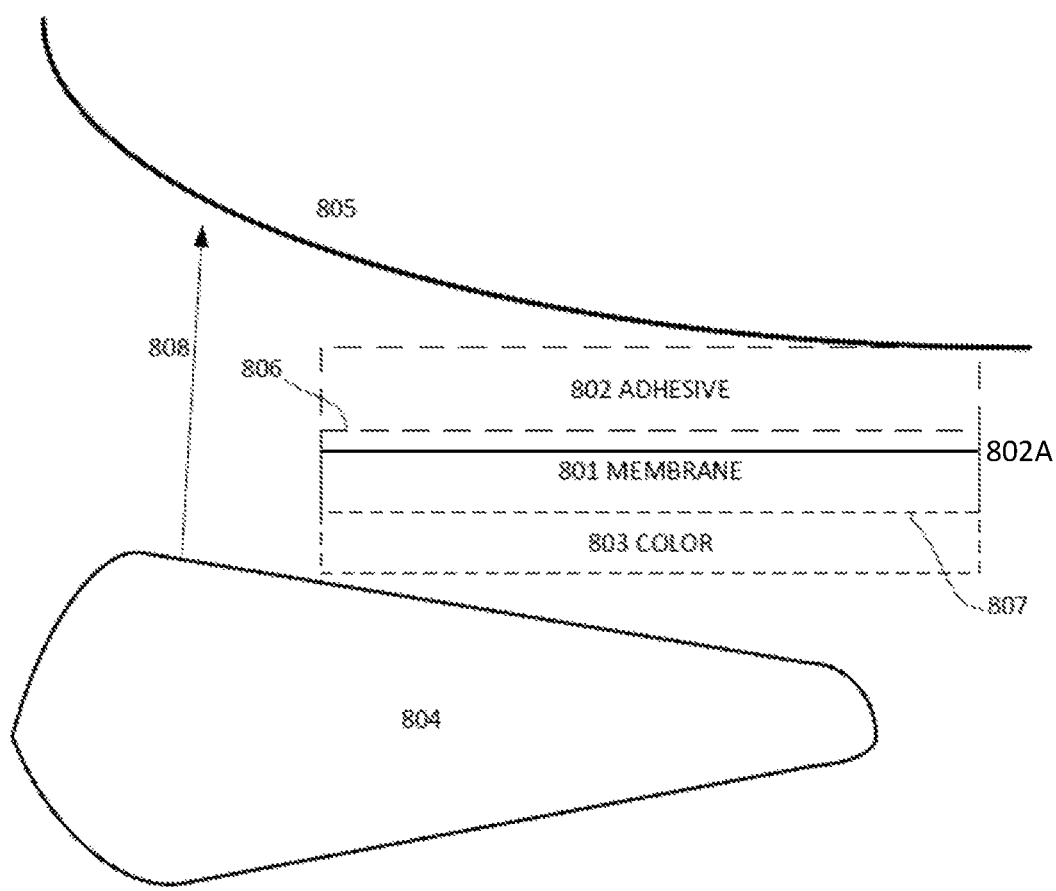
FIG. 8 illustrates an exemplary membrane and an exemplary mechanical wedge.

Referring now to FIG. 8, in some implementations a sheet of membrane 801 with a first surface 806 and a layer of adhesive 802 on the first surface 806 for removably and adhesively binding the membrane 801 to a receiving surface 805, such as a receiving surface 805 of a vehicle with a cargo bed. In addition, a color layer 803 may be included on a second layer 807 of the membrane 801. In some embodiments, a layer of adhesive 802 may include a binder layer 802A. The binder layer facilitates increased binding strength between the adhesive layer 802 and the membrane 801 and aids in removal of the adhesive from the receiving surface 805 when the membrane 801 is removed.

On another aspect, the present invention may include a mechanical wedge 804 for providing force 808 holding the membrane 801 against the surface 805, such as a surface of a vehicle with a cargo bed. Preferably the mechanical wedge 804 is formed from a compressible foam, such as a rubber or polyurethane foam, other materials are within the scope of the present invention.

CONCLUSION

A number of embodiments of the present disclosure have been described. While this specification contains many specific implementation details, there should not be construed as limitations on the scope of any disclosures or of what may be claimed, but rather as descriptions of features specific to particular embodiments of the present disclosure.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A method of sealing a cargo bed of a vehicle, the method comprising the steps of:
   a) extending a first sheet of a membrane with an adhesive layer on a first side of the membrane across a cargo bed to a first receiving surface comprising a side extension generally perpendicular to the cargo bed and proximate to the cargo bed;
   b) affixing the first sheet of the membrane to the first receiving surface of the cargo bed by applying pressure to a second side of the first sheet of membrane thereby adhering the adhesive layer to the first receiving surface proximate to the cargo bed;
   c) extending a second sheet of the membrane with an adhesive layer on the first side of the membrane across the cargo bed to a second receiving surface comprising the side extension generally perpendicular to the cargo bed and proximate to the cargo bed thereby covering at least a portion of the cargo bed and covering an overlap portion of the first sheet of membrane with a portion of the second sheet of membrane with an adhesive layer on the first side of the membrane;
   d) applying pressure to the second side of the second sheet of membrane towards the second receiving surface thereby adhering the second sheet of membrane to the second receiving surface and also adhering a portion of the second sheet of membrane to the overlap portion of the first sheet of membrane;
   e) extending a third sheet of membrane with an adhesive layer on the first side of the membrane across the cargo bed to a third receiving surface comprising the side extension generally perpendicular to the cargo bed and proximate to the cargo bed, thereby covering a third portion of the cargo bed and covering an overlap portion of the second sheet of membrane with a portion of the third sheet of membrane with an adhesive layer on the first side of the membrane; and
   f) adhering a third sheet of the membrane with an adhesive layer on the first side of the membrane to a third receiving surface proximate to the cargo bed and to an overlap portion of the second sheet of membrane by applying pressure to a second side of the second portion of membrane towards the third receiving surface.

2. The method of claim 1 additionally comprising the step of extracting the first sheet of the membrane, the second sheet of the membrane and the third sheet of membrane from a roll of membrane.

3. The method of claim 2 additionally comprising the step of extending the second portion of membrane in an upward direction in relation to the cargo bed, after affixing the first portion of membrane to the first receiving surface and prior to extending the second portion across the cargo bed.

4. The method of claim 3 additionally comprising the steps of:
   extending a fourth portion of the membrane over a tailgate proximate to the cargo bed;
   folding the fourth portion downward over the tailgate; and
   adhering the fourth portion to the tailgate.

5. The method of claim 4 additionally comprising the steps of:
   removing a portion of one of the first sheet, the second sheet or the third sheet of membrane via a cut away in one of the first sheet, the second sheet or the third sheet of membrane; and resealing the cut away with a fourth sheet of membrane with an adhesive layer on a first side of the membrane without disturbing a remaining portion of the first sheet, the second sheet or the third sheet of membrane.

6. The method of claim 5 wherein the cut away accommodates a feature of the vehicle.

7. The method of claim 6 wherein the feature comprises a taillight.

8. The method of claim 6 wherein the feature comprises a tailgate handle.

9. The method of claim 3 wherein the membrane comprises a water impermeable sheet and a binder layer that increases binding strength of the adhesive layer on the first side of the membrane, and the method additionally comprises the step of removing at least one of the first sheet of membrane, the second sheet of membrane and the third sheet of membrane from the respective receiving surfaces and the binder lay aids in removal of the adhesive layer from the respective receiving surfaces.

10. The method of claim 9 wherein the water impermeable sheet is between about 0.5 and 15 mils thick and the method further comprises forming a downward fold towards one of a tailgate and the side extension.

11. The method of claim 10 wherein the water impermeable sheet comprises polyethylene.

12. The method of claim 10 wherein the water impermeable sheet comprises a polyvinyl.

13. The method of claim 10 wherein the water impermeable sheet comprises polypropylene.

14. The method of claim 10 wherein the water impermeable sheet additionally comprises a wind resistant material.

15. The method of claim 10 wherein the water impermeable sheet additionally comprises a pattern of color and the method additionally comprises the step of selecting the pattern of color to designate an identification of contents sealed within a cargo bed.

16. The method of claim 15 additionally comprising the step of selecting the pattern of color to include a written language to designate the identification of contents sealed within a cargo bed.

17. The method of claim 15 additionally comprising the step of selecting a pattern of color comprising an image including a logo of a leasing company.

18. The method of claim 15 additionally comprising the step of selecting the pattern of color to include a symbol indicating contents of the cargo bed.

19. The method of claim 1 additionally comprising repeating one or more of steps a), b), c), d), e) and f) until a moisture proof seal against weather is formed onto an exterior of the cargo bed.

20. The method of claim 19 wherein multiple sheets of membrane comprising the first sheet of membrane, the second sheet of membrane and the third sheet of membrane completely cover the cargo bed and provide a water impermeable seal and a least a portion of the impermeable seal is transparent to allow inspection of contents of the cargo bed without removal of the water impermeable seal.

* * * * *